United States Patent [19]
Murray

[11] 3,819,348
[45] June 25, 1974

[54] SIMPLIFIED METHOD FOR BONDING FERRITE CORES

[75] Inventor: Joseph John Murray, Nesconset, N.Y.

[73] Assignee: Potter Instrument Company, Inc., Plainview, N.Y.

[22] Filed: July 26, 1971

[21] Appl. No.: 166,125

[52] U.S. Cl............... 65/36, 29/603, 65/42, 65/43, 65/58, 65/81
[51] Int. Cl............................................. C03b 23/20
[58] Field of Search............ 65/36, 42, 58, 81, 122, 65/43, 59; 29/603

[56] References Cited
UNITED STATES PATENTS

| 3,246,383 | 4/1966 | Peloschek et al.................. 29/603 |
| 3,279,902 | 10/1966 | Gardner................................. 65/36 |
| 3,405,019 | 10/1968 | Seil et al.......................... 156/382 X |
| 3,508,996 | 4/1970 | Hill...................................... 156/382 |
| 3,687,650 | 8/1972 | Case et al............................ 65/58 X |

Primary Examiner—S. Leon Bashore
Assistant Examiner—Kenneth M. Schor
Attorney, Agent, or Firm—Lane, Aitken, Dunner & Ziems

[57] ABSTRACT

In a method for manufacturing glass-bonded ferrite-core magnetic transducers, cavities formed between a pair of ferrite blocks are evacuated in order to clamp the blocks together and to insure that the glass flows adequately into gaps to be bonded.

2 Claims, 5 Drawing Figures

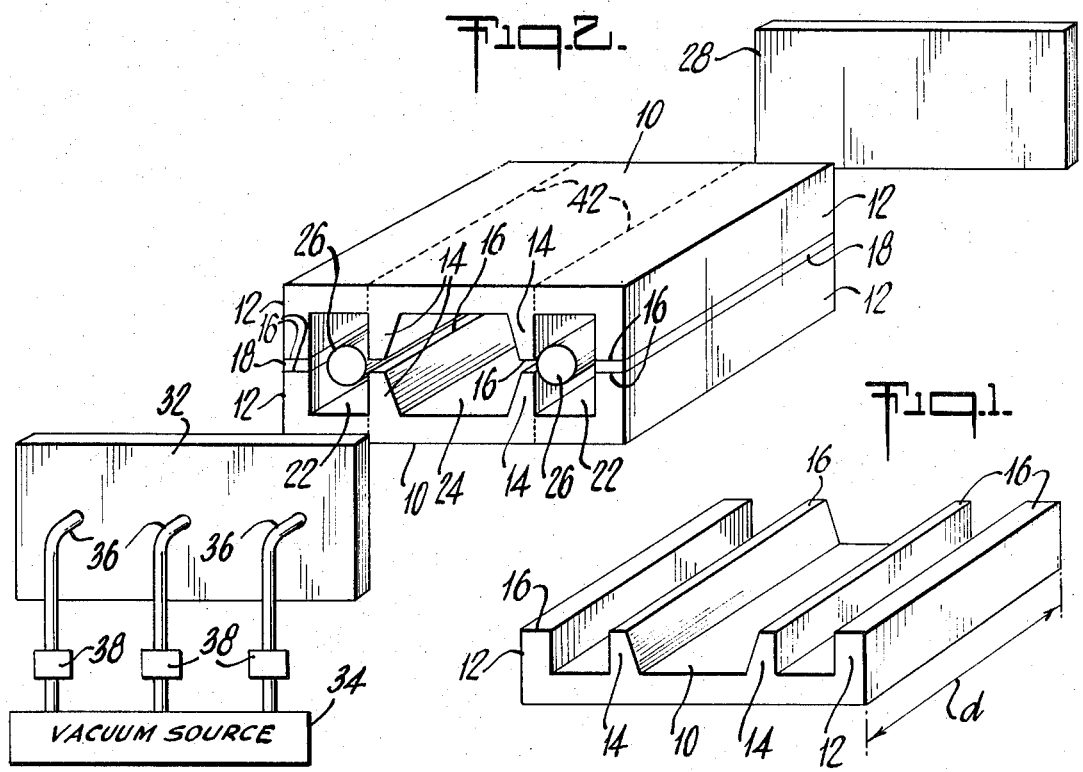
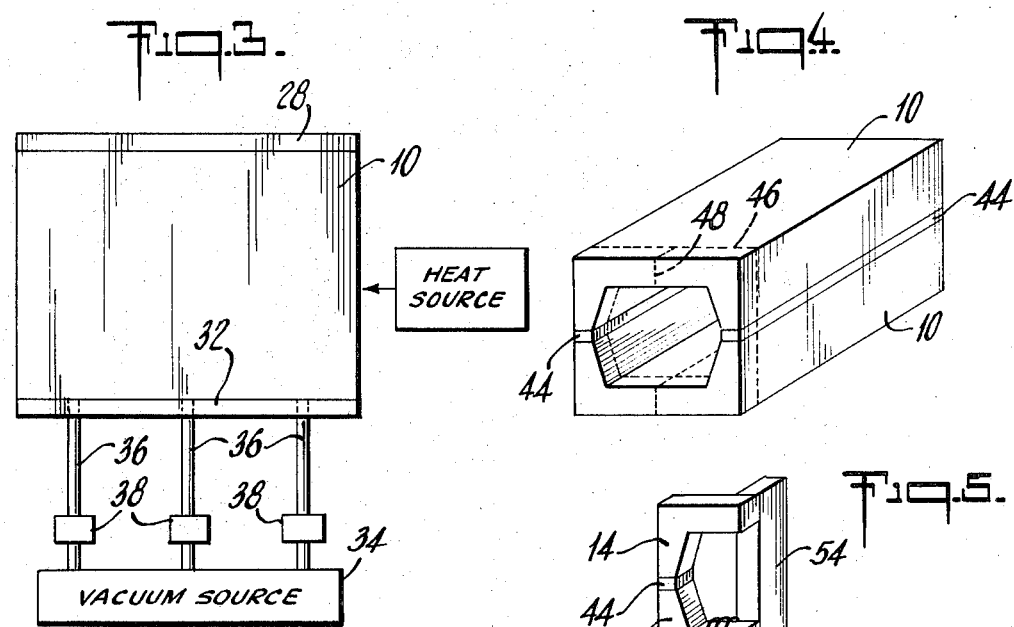

SIMPLIFIED METHOD FOR BONDING FERRITE CORES

BACKGROUND OF THE INVENTION

The field of the present invention is magnetic transducers and more particularly an improved method for the manufacture of transducers which have very narrow transducing gaps.

One type of magnetic transducer known in the prior art has a pair of ferrite pole pieces bonded together at the transducing gap by glass. Although a number of different methods are known in the art for producing such glass-bonded, ferrite-core transducers, one of the most satisfactory, least expensive, and widely used is to cause molten glass to flow by capillary action into a gap between two ferrite blocks which are held in precise spatial relationship by external clamping apparatus. However, attempts to manufacture transducers with extremely narrow gaps by this method have not proved altogether satisfactory due to the complexity of the clamping apparatus required and the elevated temperatures required to cause the glass to flow freely. Because of these problems, an alternative process is used in the prior art for manufacturing glass-bonded, ferrite-core transducers with narrow gaps. In this process, glass is deposited on the surfaces of the ferrite pieces prior to bonding. This method of manufacture is disadvantageous in that it requires the use of costly equipment for precisely depositing the glass.

The objects of the invention include the provision of a new method for manufacturing glass bonded ferrite-core magnetic transducers which is generally similar to the prior art process in which capillary action is relied upon to cause the glass to flow. However, this new method eliminates the need for expensive fixtures and can be used to manufacture narrow gap transducers at relatively low temperatures as compared with prior art capillary action methods.

SUMMARY OF THE INVENTION

Briefly, this invention contemplates a method for manufacturing magnetic transducers in which a pair of ferrite blocks are clamped together by pneumatic pressure with a narrow gap between them. A glass bonding material is placed on one side of the gap and a pressure differential is maintained across the gap. The assembly is then heated so that the glass flows into the gap. Upon cooling, the glass hardens and blocks are bonded together.

BRIEF DESCRIPTION OF THE DRAWINGS

FIG. 1 is a perspective view of a ferrite block;

FIG. 2 is a perspective view of a pair of the blocks shown in FIG. 1 in position for bonding;

FIG. 3 is a plan view of the assembly shown in FIG. 2;

FIG. 4 is a perspective view of a pair of ferrite blocks which have been bonded together and partially finished;

FIG. 5 is a perspective view of a completed transducer assembly.

DETAILED DESCRIPTION OF THE PREFERRED EMBODIMENT

Referring now to FIG. 1 of the drawings, a ferrite block 10 of sufficient width d to make several transducers is formed in a manner well known to those skilled in the art. The block has two exterior legs 12 and two interior legs 14 which are machined and lapped to form a facial surface 16 on each leg all of which advantageously lie in a single plane.

Referring to FIG. 2, in accordance with the teachings of this invention, a pair of the blocks 10 are brought together with their facial surface 16 respectively aligned. A pair of spacers or shims 18 disposed between the exterior legs 12 maintain a gap between the faces of the interior legs 14. It is these gaps that will be glass-bonded together and which will serve as the transducing gaps. It will be understood that if desired, the exterior legs 12 may be finished so that they are slightly longer than the interior legs 14, thus eliminating the need for spacers 18.

As can be seen in FIG. 2, the ferrite blocks 10 form two outer cavities 22 and a central cavity 24. A glass rod 26 is placed in each outer cavity 22 and the cavities are sealed by means of a front plate 32 and a rear plate 28, as shown in FIG. 3.

After the plates 28 and 32 are in position the two outer cavities 22 and the central cavity 24 are evacuated by means of a vacuum pump 34. Conduits 36 couple the vacuum pump 34 to the cavities 22 and 24 and the pressure in each can be individually adjusted by means of a suitable valve 38.

The pressure in the chambers 22 and in the chamber 24 is reduced below the external atmospheric pressure on the blocks thereby clamping the blocks tightly together and fixing their positions relatively to one another. The pressure in each outer chamber 22 is adjusted so that it is higher than the pressure in the central chamber 24. The entire assembly is then heated to a temperature sufficient to cause the glass flow into the gaps formed between the interior legs 14 and the pressure differential across the gap insures a uniform filling of the gap with glass even at relatively low temperatures. After the glass has filled the gaps, the heat is removed and the assembly is permitted to cool. The glass hardens as it cools, bonding the blocks together.

It should be noted that owing to the pressure differential across the gaps, the glass can be forced into the gaps by heating it to a temperature only slightly above its softening point. This permits reliable bonding at relatively lower temperatures than with prior art techniques which is advantageous because high temperatures may have a deleterious effect on the materials. Further, it should be noted the chambers need not be evacuated. If desired, the external pressure on the block assembly could be increased relatively to that of the sealed chambers and the pressure in the outer chamber could be increased relatively to the pressure in the central chamber.

After the assembly has cooled, the plates 28 and 32 are removed and chambers 22 are then cut away in a suitable manner known in the art. The chambers are removed to the dotted lines 42 in FIG. 2. In this step all excess glass is also removed leaving the assembly shown in FIG. 4, in which the glass bond gaps are indicated by the reference numeral 44. The surfaces containing the gaps 44 are polished and lapped to a desired contour at this stage.

Next the joined ferrite blocks shown in FIG. 4 are cut generally along the dotted line 46 and then along the dotted line 48 in order to form individual transducers such as is shown in FIG. 5. A coil of wire 52 is placed on one leg of the transducer and the magnetic circuit is then complete by means of a ferrite bar 54 which may be fixed in place by a suitable epoxy adhesive.

Thus, it will be appreciated that the objects of the invention have been accomplished. The blocks are clamped together precisely, but without the requirements for expensive fixtures. In addition the bonding material flows reliably and uniformly into the narrow gaps, even at a relatively low temperature. While the invention has been described with particular reference to glass-bonding of ferrite pole pieces, it will be understood that it can be employed with other materials.

Although the present invention has been described with reference to specific embodiments, it will be appreciated that a variety of changes may be made without departing from the scope of the invention. For example, certain features may be used independently of others and equivalents may be substituted all within the spirit and scope of the invention.

What is claimed is:

1. Method of manufacturing magnetic transducer with a narrow transducing gap including the steps of:

positioning two pieces of core material in a facing relationship, said two pieces so shaped as to form two chambers between said pieces of core material and separated by a wall with a narrow gap therein;

placing a solid charge of bonding material in one of said chambers;

pneumatically sealing said chambers;

creating pressure in said chambers lower than that of the atmosphere surrounding said two pieces of core material to clamp together said pieces of core material; and heating said clamped together pieces of core material to a temperature which causes said material to flow into said gap.

2. A method, as in claim 1, of manufacturing a magnetic transducer with a narrow transducing gap including the further step of maintaining an increased pressure in the chamber in which the bonding material is placed relative to the pressure in the other chamber to assist the flow of bonding material in the said gap.

* * * * *